(No Model.)
G. H. PERKINS.
INSTRUMENT FOR MEASURING THE VISCOSITY OF LIQUIDS.
No. 358,877. Patented Mar. 8, 1887.
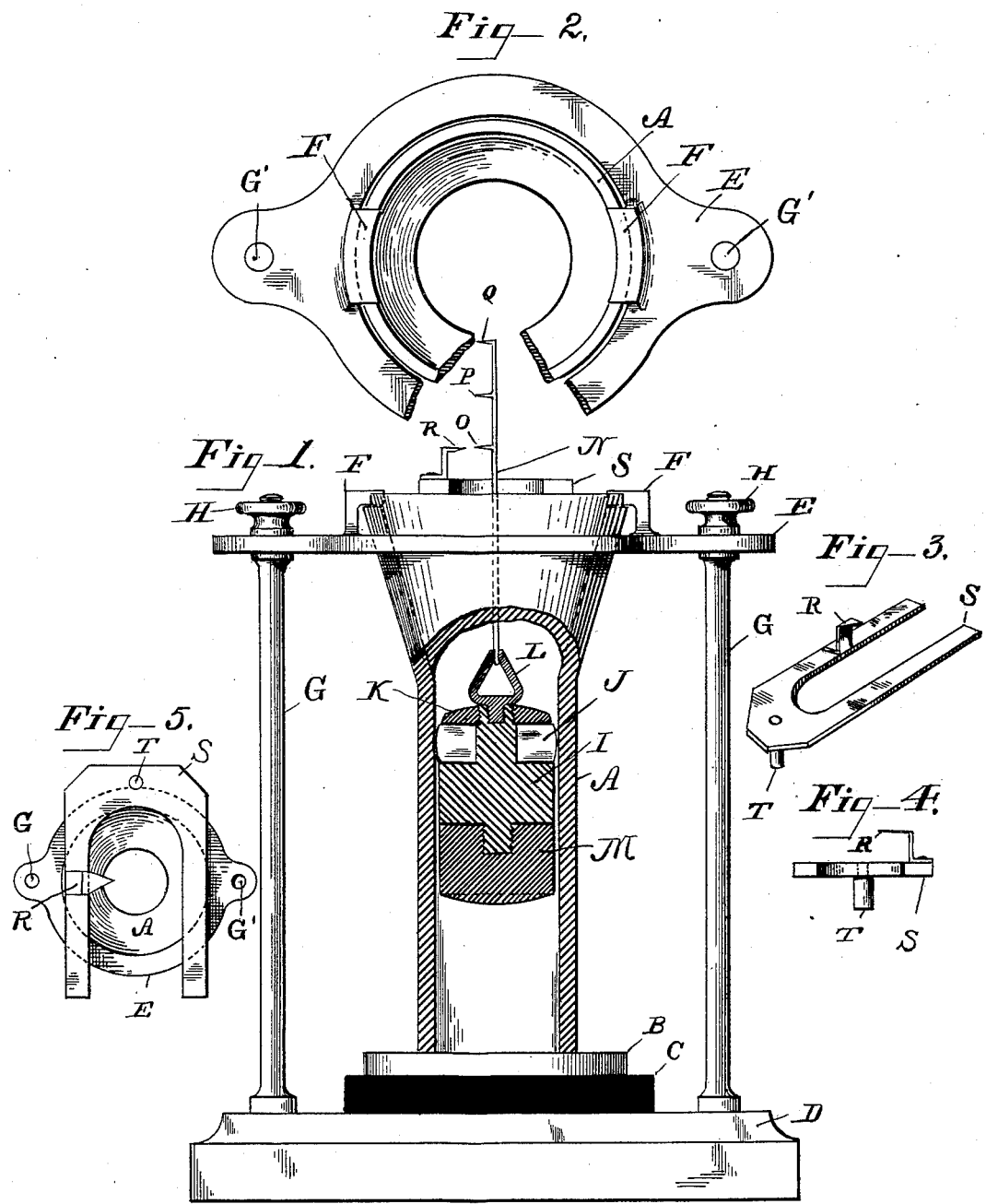
WITNESSES:—
George H. Perkins, INVENTOR
By his Attorneys

UNITED STATES PATENT OFFICE.

GEORGE H. PERKINS, OF PHILADELPHIA, PENNSYLVANIA.

INSTRUMENT FOR MEASURING THE VISCOSITY OF LIQUIDS.

SPECIFICATION forming part of Letters Patent No. 358,877, dated March 8, 1887.

Application filed August 16, 1886. Serial No. 210,991. (No model.)

*To all whom it may concern:*

Be it known that I, GEORGE H. PERKINS, a citizen of the United States, residing in the city and county of Philadelphia and State of Pennsylvania, have invented an Improved Instrument for Measuring the Viscosity of Liquids, of which the following is a specification.

Heretofore it has been usual to measure the viscosity of liquids by causing the liquid to be measured to flow through and from a tube of predetermined bore, the viscosity being determined by the time required for a given quantity of such liquid to escape from said tube. I have discovered that this method of measurement of viscosity is erroneous: first, because no provision is made for the adjustment of the measuring device to liquids of different specific gravities, whereby it results that liquids of high specific gravity escape from said tube more quickly than liquids of low specific gravity, even though said liquids are of the same or of about the same degree of viscosity; second, because in the escape of the liquid through the measuring-tube that portion of the liquid in the center of the tube, and which is not in contact with its inner surface, escapes more rapidly than that portion in contact with said surface.

The object of my invention is to provide an instrument in which every portion of the liquid to be measured, shall, as fully as possible, come into contact with the surfaces of the tube or device through which it is caused to pass for the purpose of measuring its viscosity, and also to provide an instrument which may be adjusted and regulated to correspond to the gravities of the respective liquids whose viscosities are to be measured; and it consists as hereinafter specifically described and claimed.

In the drawings is shown a preferred form of a convenient embodiment of my invention, in which—

Figure 1 is an elevation partly in section. Fig. 2 is a partial top plan view of the devices, as shown in Fig. 1. Fig. 3 is a perspective detail. Fig. 4 is an elevation, partly in section, of the device shown in Fig. 3. Fig. 5 is a top plan view of the device shown in Fig. 3 when said device is in place upon the parts shown in Fig. 2.

A is a bell-mouthed tube, preferably of glass, the interior bore of the cylindrical portion of which is ground, so as to provide a smooth and even surface. This tube at its lower end is ground and is supported upon a ground-glass plate, B, which in turn is supported upon a rubber or other yielding plate, C, which rests upon a base-block, D.

E is a yoke provided with lugs F F, and with a circular orifice of somewhat larger diameter than the diameter of the bell-mouthed end of the tube A, and of such construction that the lugs F F take into and rest in slots or seats upon the upper end of said tube A. This yoke is provided with diametrically-oppositely placed holes G' G' adapted to respectively receive the upper ends of posts G G, attached to and sprung from the base D. These posts are at their upper extremities provided with screw-threads and nuts H H, the construction being such that the lower end of the tube A can be forced into close contact with the plate B by means of the yoke E, lugs F, and nuts H.

The tube A is provided with a composite plunger, of which the part I is a block of brass or other suitable metal, and the part J an annular disk of glass, the peripheral edge of which is ground and rounded so as to come nearly into tangential contact with the surface of the bore of the cylindrical part of the tube A, the disk J being the segment of a sphere, the diameter of which is equal to the longest horizontal diameter of said disk J. Superimposed upon the disk I is a brass or other metallic cap, K, which is screwed upon a stem or post sprung from the block I. To this post, at its upper extremity, is attached, by a screw-threaded connection, a link or handle, L.

M is a make-weight, of brass or of other suitable material, removably, by a screw-threaded connection or in any other desired manner, attached to the lower end of the block I. The parts K, I, and M are of lesser diameter than the diameter of the cylindrical part of the tube A.

N is a pointer-rod attached to and supported upon the upper extremity of the composite plunger, and provided with pointers O, P, and Q, constructed and arranged to, in the descent of the plunger, approach and register with a pointer, R, supported upon a fork-frame, S, adapted to be laid upon and supported by the upper end of the tube A.

T is a stop on the fork-frame S, to insure the placing of the pointer R in position opposite the center of the tube A.

In the use of the instrument described, said instrument and tube having been placed in a water bath of proper temperature to bring the temperature of the liquid to be tested to the proper point, and the tube A having in any proper manner been adjusted in a vertical position, the liquid the viscosity of which is to be measured is placed in the tube A. The composite plunger is then inserted therein and descends at a speed proportioned to the rate of upward flow of the liquid between the outer or peripheral surface of the disk J and the inner wall of the tube A. The speed at which the plunger descends is determined by the time occupied in the descent of the pointers P or Q through the predetermined distances from the pointer R at which they have been set. In the use of the instrument just described it is obvious that substantially every portion of of the liquid which escapes from a position below to a position above the plunger must come into contact with the surfaces of the annular orifice through which it passes.

If the instrument be so adjusted that the plunger shall descend one inch in one minute through a liquid of a specific gravity of, say, one thousand, it may be adjusted for the measurement of the viscosity of a liquid of a specific gravity of nine hundred by simply removing the make-weight M and placing in its stead a make-weight of such weight that the weight of the composite plunger shall be nine-tenths of its weight when employed in the measurement of the viscosity of a liquid of a specific gravity of one thousand. In other words, in the measurement of the viscosity of liquids of different specific gravities by the instrument above described (it being understood that the viscosity of a liquid does not depend upon its specific gravity) it will only be necessary to increase or decrease the weight of the composite plunger according to the increase or decrease of the specific gravity of the liquid the viscosity of which shall have been arbitrarily taken as the unit of viscosity.

The bell-mouthed form of tube permits liquids to be more easily introduced within it, and also permits air-bubbles to more easily escape upon the introduction of the plunger. The instrument, when constructed as shown, may, after being used, be taken apart and the tube be thoroughly cleansed.

It will be obvious that a tube of the same diameter throughout and having its lower end permanently closed and provided with a plunger of a construction different from that shown in the drawings may be employed without departing from my invention.

It will be obvious that the diameter of the disk J may be varied to cause it to fit the bore of the tube A more or less closely, so as to vary the thickness of the annular film of liquid which in the descent of the plunger escapes from a position below said plunger to a position above it, and that the accuracy of the instrument in measuring viscosity will increase in proportion to the thinness of the annular ribbon of liquid which escapes from below to a position above the plunger.

Having thus described my invention, I claim—

1. The method of measuring the viscosity of liquids of different specific gravities, which consists in causing a plunger the weight of which has a fixed ratio to the specific gravity of the liquid the viscosity of which is to be measured, and which closely fits the bore of a vertical tube, the lower end of which is closed, to descend through said liquid, as specified.

2. An instrument for measuring the viscosity of liquids, consisting of a vertical tube closed at its lower end and provided with a plunger closely fitted therein, and whose weight has a fixed ratio to the specific gravity of the liquid the viscosity of which is to be measured, and adapted to descend through and permit the liquid below said plunger to flow above said plunger, as specified.

3. In an instrument for measuring the viscosity of liquids, in combination, a vertical tube closed at its lower end, a plunger whose weight has a fixed ratio to the specific gravity of the liquid the viscosity of which is to be measured, and closely fitted in said tube and adapted to descend through and permit the liquid below said plunger to flow above said plunger, a pointer attached to and adapted to descend with said plunger, and a stationary pointer suitably supported and vertically adjusted at a desired and predetermined distance from the first-named pointer, as specified.

In testimony whereof I have hereunto signed my name this 13th day of August, A. D. 1886.

GEORGE H. PERKINS.

In presence of—
 F. N. DIXON,
 JOHN W. ORR.